United States Patent
Maroonian et al.

(10) Patent No.: US 9,395,254 B2
(45) Date of Patent: Jul. 19, 2016

(54) TRANSMISSION TORQUE ESTIMATION UNIT

(71) Applicant: JTEKT Corporation, Osaka-shi (JP)

(72) Inventors: Aris Maroonian, Nara (JP); Tsutomu Tamura, Nara (JP); Robert Fuchs, Louveciennes (FR)

(73) Assignee: JTEKT CORPORATION, Osaka-shi (JP)

(*) Notice: Subject to any disclaimer, the term of this patent is extended or adjusted under 35 U.S.C. 154(b) by 455 days.

(21) Appl. No.: 14/071,852

(22) Filed: Nov. 5, 2013

(65) Prior Publication Data
US 2014/0136124 A1    May 15, 2014

(30) Foreign Application Priority Data

Nov. 9, 2012    (JP) .................................. 2012-247899

(51) Int. Cl.
*G06F 19/00* (2011.01)
*G01L 3/00* (2006.01)
*F16D 48/06* (2006.01)

(52) U.S. Cl.
CPC . *G01L 3/00* (2013.01); *F16D 48/06* (2013.01); *F16D 48/064* (2013.01); *F16D 48/066* (2013.01); *F16D 2500/1022* (2013.01); *F16D 2500/1026* (2013.01); *F16D 2500/30402* (2013.01); *F16D 2500/30406* (2013.01); *F16D 2500/30415* (2013.01); *F16D 2500/30426* (2013.01); *F16D 2500/7042* (2013.01); *F16D 2500/7082* (2013.01)

(58) Field of Classification Search
CPC ...... B60W 10/02; B60W 10/06; B60W 20/40
USPC .............................................................. 702/4
See application file for complete search history.

(56) References Cited

U.S. PATENT DOCUMENTS

| | | | | |
|---|---|---|---|---|
| 2009/0270224 | A1* | 10/2009 | Minami | B62M 7/02 477/101 |
| 2011/0190996 | A1* | 8/2011 | Nedachi | F16D 48/066 701/67 |
| 2012/0048062 | A1 | 3/2012 | Kokubo | |

FOREIGN PATENT DOCUMENTS

JP    2012-72892    4/2012

* cited by examiner

*Primary Examiner* — Edward Raymond
(74) *Attorney, Agent, or Firm* — Oblon, McClelland, Maier & Neustadt, L.L.P.

(57) ABSTRACT

A transmission torque estimation unit estimates a torque transmittable between an outer rotary member and an inner rotary member with respect to a control signal based on: a first model obtained by modeling an equation of motion of the outer rotary member in a rotation direction; a second model obtained by modeling an equation of motion, in the rotation direction, of a support cam member and an inner pilot clutch disc as one unit; a third model obtained by modeling an equation of motion of the outer main clutch discs in the rotation direction; a fourth model obtained by modeling an equation of motion of the inner rotary member in the rotation direction; and a fifth model containing a viscoelastic model and obtained by modeling an equation of motion, in an axial direction, of the inner main clutch disc and the movable cam member as one unit.

18 Claims, 7 Drawing Sheets

US 9,395,254 B2

TRANSMISSION TORQUE ESTIMATION UNIT

INCORPORATION BY REFERENCE

The disclosure of Japanese Patent Application No. 2012-247899 filed on Nov. 9, 2012 including the specification, drawings and abstract, is incorporated herein by reference in its entirety.

BACKGROUND OF THE INVENTION

1. Field of the Invention

The invention relates to a transmission torque estimation unit that estimates a torque that a driving force transmission apparatus is able to transmit.

2. Description of the Related Art

A driving force transmission apparatus is used, for example, as a coupling that is able to switch the vehicle drive mode between a two-wheel drive mode and a four-wheel drive mode. Japanese Patent Application Publication No. 2012-072892 (JP 2012-072892 A) describes a configuration in which a cam mechanism is provided between a main clutch and an electromagnetic clutch. In such a driving force transmission apparatus, the cam mechanism operates in accordance with the electromagnetic clutch that operates in response to a control signal, thereby changing the engagement state of the main clutch. Such a configuration makes it possible to adjust a torque to be transmitted, according to the control signal.

Whether the control and the design of the driving force transmission apparatus are appropriate is evaluated on the basis of, for example, whether a target transmission torque based on an input torque and a control signal is output from the driving force transmission apparatus. Therefore, it is necessary to accurately figure out a transmission torque that varies depending on the control signal and the state of the driving force transmission apparatus. In contrast to this configuration, for example, modeling in which a clutch is assumed to be formed of two clutch discs has been known. With this modeling, it is possible to generally estimate a transmittable torque, based on a coefficient of friction corresponding to a relative velocity between the clutch discs and a pressing force that acts on each clutch disc.

However, in the driving force transmission apparatus, when a transmission torque with respect to rotational angles of an input shaft and an output shaft is actually measured, the transmission torque is indicated by a complicated hysteresis curve due to the influence of each member, as illustrated in FIG. 6B in JP 2012-072892 A. Therefore, with the aforementioned simple model, a large difference may occur between an estimated torque and an actually transmittable torque.

SUMMARY OF THE INVENTION

One object of the invention is to provide a transmission torque estimation unit that efficiently models each of members that constitute a driving force transmission apparatus, thereby estimating a transmission torque more accurately.

An aspect of the invention relates to a transmission torque estimation unit for a driving force transmission apparatus. The driving force transmission apparatus includes: a cylindrical outer rotary member; an inner rotary member arranged inside the outer rotary member so as to be coaxial with the outer rotary member and rotatable relative to the outer rotary member; a main clutch that transmits a torque between the outer rotary member and the inner rotary member; an electromagnetic clutch device including a pilot clutch that is able to transmit a torque of the outer rotary member by attracting an armature with a magnetic force corresponding to a control signal; and a cam mechanism that is arranged between the main clutch and the pilot clutch, and that moves a movable cam member with respect to a support cam member in an axial direction by converting, into an axial pressing force, a torque based on a difference in rotational speed between rotation of the inner rotary member and rotation of the outer rotary member, which is transmitted via the pilot clutch, to press the main clutch. The main clutch includes inner main clutch discs that are restrained from rotating relative to the inner rotary member but allowed to move in the axial direction, and outer main clutch discs that are restrained from rotating relative to the outer rotary member but allowed to move in the axial direction. The pilot clutch includes an inner pilot clutch disc that is restrained from rotating relative to the support cam member but allowed to move in the axial direction, and an outer pilot clutch discs that are restrained from rotating relative to the outer rotary member but allowed to move in the axial direction. The transmission torque estimation unit estimating a torque transmittable between the outer rotary member and the inner rotary member with respect to the control signal based on: a first model containing a friction model of the pilot clutch, and obtained by modeling an equation of motion of the outer rotary member in a rotation direction; a second model containing the friction model of the pilot clutch, and obtained by modeling an equation of motion, in the rotation direction, of the support cam member and the inner pilot clutch disc as one unit; a third model containing a friction model of the main clutch, and obtained by modeling an equation of motion of the outer main clutch discs in the rotation direction; a fourth model containing the friction model of the main clutch, and obtained by modeling an equation of motion of the inner rotary member in the rotation direction; and a fifth model containing a cam operation model indicating a displacement of the movable cam member with respect to a phase difference between the support cam member and the movable cam member, and axial viscoelastic models of the main clutch and the cam mechanism, the fifth model being obtained by modeling an equation of motion, in the axial direction, of the inner main clutch disc and the movable cam member as one unit.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, a transmission torque estimation unit 70 for a driving force transmission apparatus 1 according to an embodiment of the invention will be described with reference to the accompanying drawings. The transmission torque estimation unit 70 models each of members that constitute the driving force transmission apparatus 1, thereby estimating a transmission torque that varies depending on a control signal that is input into the driving force transmission apparatus 1, and the state of the driving force transmission apparatus 1, that is, a rotation angular velocity of an outer case 10 on the driving force input side and a rotation angular velocity of an inner shaft 20 on the driving force output side.

The driving force transmission apparatus 1 is applied to, for example, a driving force transmission system for auxiliary drive wheels of a four-wheel-drive vehicle, to which driving force is transmitted depending on a travelling state of the vehicle. More specifically, in the four-wheel-drive vehicle, the driving force transmission apparatus 1 is, for example, arranged between and coupled to a propeller shaft to which driving force is transmitted from an engine and a rear differential for the auxiliary drive wheels, or arranged between and coupled to the rear differential and a drive shaft. In the present embodiment, the former case will be described as an example.

Figure 1:
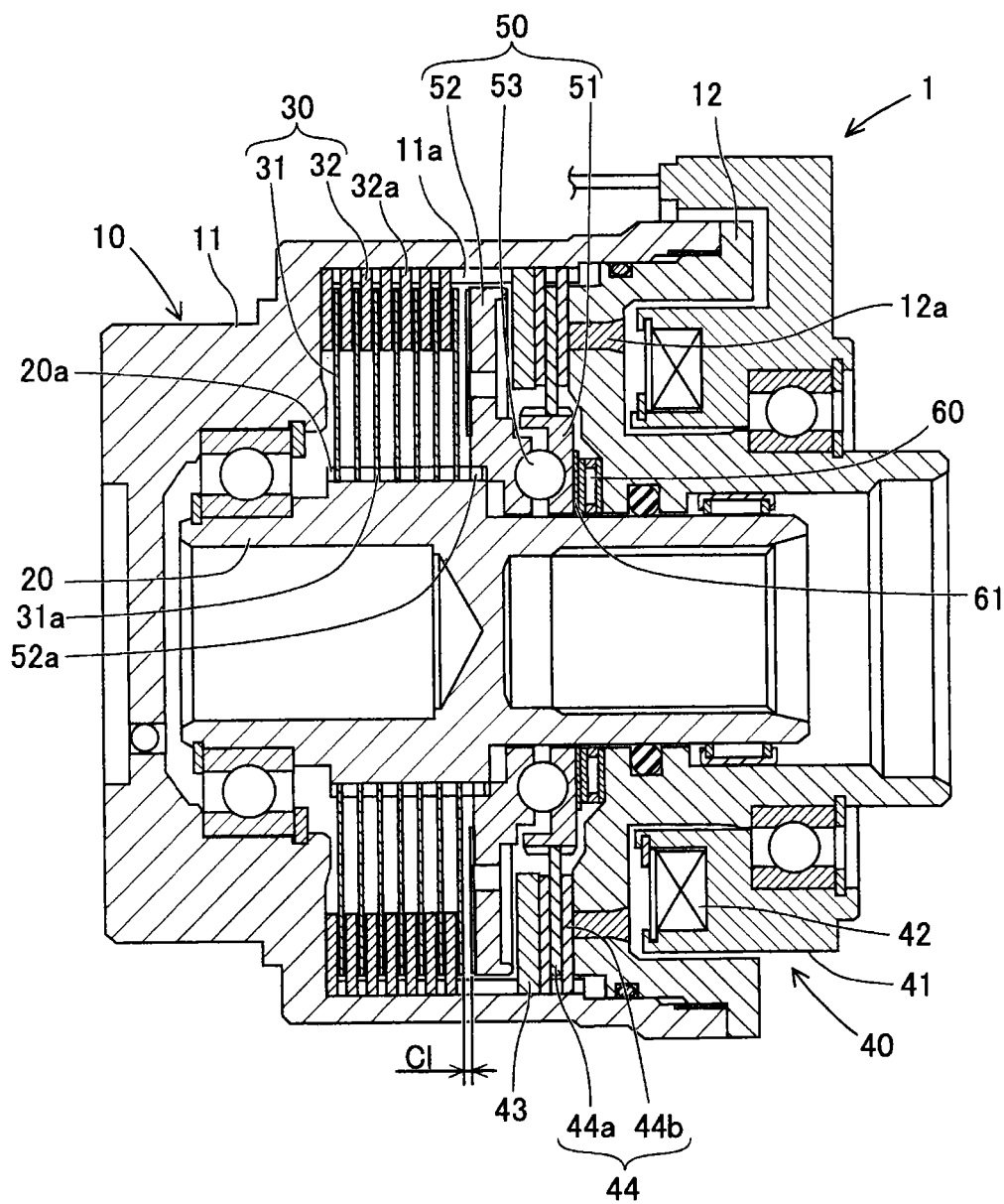
FIG. 1 is a sectional view of a driving force transmission apparatus according to an embodiment of the invention, taken along an axial direction of the driving force transmission apparatus.

The driving force transmission apparatus 1 is switched between a connection state in which a driving force is transmitted to the auxiliary drive wheels and a disconnection state in which driving force is not transmitted to the auxiliary drive wheels. In the connection state, the driving force transmission apparatus 1 transmits the driving force transmitted from the propeller shaft, to the auxiliary drive wheels with a variable distribution ratio. For example, when a difference in rotational speed is caused between front wheels and rear wheels, the driving force transmission apparatus 1 operates to reduce the difference in rotational speed. The driving force transmission apparatus 1 is formed of a so-called electronically-controlled coupling. As illustrated in FIG. 1, the driving force transmission apparatus 1 includes an outer case 10, an inner shaft 20, a main clutch 30, an electromagnetic clutch device 40, and a cam mechanism 50.

The outer case 10 (which may function as "outer rotary member" in the invention) is arranged radially inward of a cylindrical hole cover (not shown), and is supported so as to be rotatable relative to the hole cover. The outer case 10 is formed in a cylindrical shape as a whole, and is formed of a front housing 11 and a rear housing 12 located closer to the rear of the vehicle than the front housing 11 (located on the right side in FIG. 1).

The front housing 11 is made of, for example, an aluminum alloy that is a non-magnetic material containing aluminum as a main component, and is formed in a bottomed tubular shape. A cylindrical portion of the front housing 11 is rotatably supported at its outer peripheral face by an inner peripheral face of the hole cover via a bearing. Further, a bottom portion of the front housing 11 is coupled to a rear end of the propeller shaft (not shown) in the vehicle longitudinal direction. Therefore, the front housing 11 is arranged such that the opening side of the front housing 11 in the bottomed tubular shape faces the rear of the vehicle. Internal splines 11*a* are formed in an axial center portion of an inner peripheral face of the front housing 11, and an internal thread is formed in a portion of the inner peripheral face of the front housing 11, which is located near the opening.

The rear housing 12 is formed in an annular shape, and is arranged radially inward of the opening-side portion of the front housing 11 so as to be fixedly fitted to the front housing 11. An annular groove is formed in a rear portion of the rear housing 12 in the vehicle longitudinal direction so as to extend over the whole circumference. An external thread is formed on an outer peripheral face of the rear housing 12, and the external thread is tightened to the internal thread of the front housing 11. By fastening the internal thread of the front housing 11 to the external thread of the rear housing 12 and bringing the opening-side end face of the front housing 11 into contact with the end face of the step portion of the rear housing 12, the front housing 11 and the rear housing 12 are fixed to each other.

The rear housing 12 has an annular member 12*a* that is made of a nonmagnetic material such as stainless steel and that is part of the bottom of the annular groove. Part of the rear housing 12 other than the annular member 12*a* is made of a material that contains iron, which is a magnetic material, as a main component (hereinafter, referred to as "iron-based material") to form a magnetic circuit.

External splines 20*a* are formed in an axial center portion of an outer peripheral face of the inner shaft 20. The inner shaft 20 is extended through a though-hole formed in the rear housing 12 along the central axis of the rear housing 12 in a liquid-tight manner, and is arranged in the outer case 10 coaxially with the outer case 10 so as to be rotatable relative to the outer case 10. The inner shaft 20 is rotatably supported by the front housing 11 and the rear housing 12 via bearings in a state where the axial movement of the inner shaft 20 with respect to both the front housing 11 and the rear housing 12 is restricted. A rear end portion in the vehicle longitudinal direction (right side portion in FIG. 1), of the inner shaft 20 is coupled to a differential gear (not shown). Lubricant is supplied, at a predetermined filling ratio, in a space that is defined by the outer case 10 and the inner shaft 20 in a liquid-tight manner.

The main clutch 30 transmits torque between the outer case 10 and the inner shaft 20. The main clutch 30 is a wet multi-disc friction clutch made of an iron-based material. The main clutch 30 is located between an inner peripheral face of the cylindrical portion of the front housing 11 and the outer peripheral face of the inner shaft 20 in the radial direction. The main clutch 30 is located between the bottom portion of the front housing 11 and a front end face in the vehicle longitudinal direction, of the rear housing 12 in the axial direction.

The main clutch 30 includes a plurality of inner main clutch discs 31, and a plurality of outer main clutch discs 32, and is configured such that the inner main clutch discs 31 and the outer main clutch discs 32 are arranged alternately in the axial direction. Internal splines 31a (which may function as "spline portion" in the invention") are formed in the inner peripheral side of the inner main clutch discs 31, and are fitted to the external splines 20a of the inner shaft 20. External splines 32a (which may function as "spline portion" in the invention) are formed in the outer peripheral side of the outer main clutch discs 32, and are fitted to the internal splines 11a of the front housing 11.

As described above, the main clutch 30 has spline portions 31a, 32a that are formed of the internal splines 31a of the inner main clutch discs 31 and the external splines 32a of the outer main clutch discs 32, respectively. With this configuration, the inner main clutch discs 31 are restrained from rotating relative to the inner shaft 20 but allowed to move in the axial direction. Similarly, the outer main clutch discs 32 are restrained from rotating relative to the outer case 10 but allowed to move in the axial direction. Each of the spline portions 31a, 32a is provided with a predetermined backlash (clearance in the rotation direction) with respect to a mating member to which a corresponding one of the spline portions 31a, 32a is spline-fitted.

In the electromagnetic clutch device 40, an armature 43 is drawn by a magnetic force according to a control signal to engage a pilot clutch 44. As a result, torque of the outer case 10 is allowed to be transmitted to a support cam member 51 of the cam mechanism 50. The control signal corresponds to a voltage to be applied to an electromagnetic coil 42 or a current to be supplied to the electromagnetic coil 42. The electromagnetic clutch device 40 includes a yoke 41, the electromagnetic coil 42, the armature 43, and the pilot clutch 44.

The yoke 41 is formed in an annular shape, and is accommodated in the annular groove of the rear housing 12 via a clearance so as to be rotatable relative to the rear housing 12. The yoke 41 is fixed to the hole cover. The yoke 41 is rotatably supported at its inner peripheral portion to the rear housing 12 via a bearing. The electromagnetic coil 42 is formed into an annular shape by winding a wire, and is fixed to the yoke 41.

The armature 43 is made of an iron-based material. The armature 43 is formed in an annular shape, and external splines are formed in an outer periphery of the armature 43. The armature 43 is located between the main clutch 30 and the rear housing 12 in the axial direction. The external splines of the armature 43 are spline-fitted to the internal splines 11a of the front housing 11. When a current is supplied to the electromagnetic coil 42, the armature 43 is attracted toward the yoke 41 by a magnetic force corresponding to a current value.

The pilot clutch 44 transmits torque between the outer case 10 and the support cam member 51. The pilot clutch 44 is made of an iron-based material. The pilot clutch 44 is located between the inner peripheral face of the cylindrical portion of the front housing 11 and an outer peripheral face of the support cam member 51 in the radial direction. Further, the pilot clutch 44 is located between the armature 43 and the front end face in the vehicle longitudinal direction, of the rear housing 12.

The pilot clutch 44 includes an inner pilot clutch disc 44a and a plurality of outer pilot clutch discs 44b that are alternately arranged in the axial direction. The inner pilot clutch disc 44a has internal splines formed in its inner peripheral side, and is spline-fitted to external splines of the support cam member 51. Each of the outer pilot clutch discs 44b has external splines formed on its outer peripheral side, and is spline-fitted to the internal splines 11a of the front housing 11.

When a control signal is input into the electromagnetic clutch device 40 and the electromagnetic coil 42 is energized, there is formed a magnetic circuit that passes through the yoke 41, an outer peripheral side of the rear housing 12, an outer peripheral side of the pilot clutch 44, the armature 43, an inner peripheral side of the pilot clutch 44, an inner peripheral side of the rear housing 12, and the yoke 41. Then, the armature 43 is attracted toward the yoke 41, and the inner pilot clutch disc 44a frictionally engages with the outer pilot clutch discs 44b. Thus, the torque of the outer case 10 is transmitted to the support cam member 51.

On the other hand, when no control signal is input into the electromagnetic clutch device 40 and power supply to the electromagnetic coil 42 is interrupted, a magnetic force for attracting the armature 43 is lost. Thus, the frictional engagement between the inner pilot clutch disc 44a and the outer pilot clutch discs 44b is cancelled. As a result, the pilot clutch 44 is disengaged.

The cam mechanism 50 is provided between the main clutch 30 and the pilot clutch 44. The cam mechanism 50 converts, into an axial pressing force, the torque based on the difference in rotational speed between the rotation of the inner shaft 20 and the rotation of the outer case 10, which is transmitted via the pilot clutch 44. The cam mechanism 50 moves a movable cam member 52 in such a direction that the movable cam member 52 moves away from the support cam member 51 in the axial direction, thereby pressing the main clutch 30 by the pressing force obtained through the conversion as described above. The cam mechanism 50 includes the support cam member 51, the movable cam member 52, and cam followers 53.

The support cam member 51 is formed in an annular shape, and is provided so as to face the outer peripheral face of the inner shaft 20 via a clearance. The support cam member 51 is supported by a thrust bearing 60 provided on the front end face in the vehicle longitudinal direction, of the rear housing 12 via a shim 61. With this configuration, the support cam member 51 is allowed to rotate relative to the inner shaft 20 and the rear housing 12, but restrained from moving in the axial direction. The support cam member 51 has external splines on its outer peripheral side. The external splines of the support cam member 51 are spline-fitted to the internal splines of the inner pilot clutch disc 44a. Further, a plurality of cam grooves is formed in a front end face in the vehicle longitudinal direction, of the support cam member 51.

Most part of the movable cam member 52 is made of an iron-based material, and the movable cam member 52 is formed in an annular shape. The movable cam member 52 is located forward of the support cam member 51 in the vehicle longitudinal direction. The movable cam member 52 has internal splines 52a on its inner peripheral side. The internal splines of the movable cam member 52 are spline-fitted to the external splines 20a of the inner shaft 20. Therefore, the movable cam member 52 is restrained from rotating relative to the inner shaft 20, but allowed to move in the axial direction. In addition, a plurality of cam grooves is formed in a rear end face in the vehicle longitudinal direction, of the movable cam member 52 so as to be axially opposed to the cam grooves of the support cam member 51.

A front end face in the vehicle longitudinal direction, of the movable cam member 52 is allowed to make contact with one of the inner main clutch discs 31 in the main clutch 30, which is the rearmost inner main clutch disc 31 in the vehicle longitudinal direction. In a neutral state where there is no phase difference between the support cam member 51 and the movable cam member 52, there is a predetermined clearance C1 between the rearmost inner main clutch disc 31 in the main clutch 30 and the movable cam member 52. When the movable cam member 52, which has been in the neutral state, moves toward the front of the vehicle until the clearance C1 is eliminated, the movable cam member 52 comes into contact with the inner main clutch disc 31 to press the inner main clutch disc 31 toward the front of the vehicle.

The cam followers 53 are formed in a ball shape, and are arranged in the cam grooves of the support cam member 51 and the cam grooves of the movable cam member 52, which are opposed to each other. That is, under the action of the cam followers 53 and the cam grooves, the movable cam member 52 is moved in such a direction that the movable cam member 52 moves away from the support cam member 51 in the axial direction (moves toward the front of the vehicle) when a phase difference (torsion angle) is caused between the support cam member 51 and the movable cam member 52. The larger the torsion angle between the support cam member 51 and the movable cam member 52 is, the larger the amount by which the movable cam member 52 is apart from the support cam member 51 in the axial direction is.

Next, the basic operation of the driving force transmission apparatus 1 having the above-described configuration will be described. First, an initial state in which no current is supplied to the electromagnetic coil 42 of the electromagnetic clutch device 40 will be described. In this case, because the pilot clutch 44 is not engaged, the outer case 10 and the support cam member 51 are rotatable relative to each other. Further, because the movable cam member 52 is spline-fitted to the inner shaft 20, the movable cam member 52 rotates together with the inner shaft 20. At this time, the movable cam member 52 is urged toward the rear of the vehicle by an elastic member or a centrifugal hydraulic pressure of the lubricant.

Because the rotation of the support cam member 51 is restricted only by the movable cam member 52 via the cam followers 53, the support cam member 51 rotates as the movable cam member 52 rotates. Therefore, no phase difference is caused between the support cam member 51 and the movable cam member 52. Accordingly, the cam followers 53 are located at deepest parts of the respective cam grooves of the support cam member 51 and the movable cam member 52. Therefore, the movable cam member 52 is located at a position closest to the support cam member 51, that is, a position furthest from the main clutch 30.

As described above, when the cam mechanism 50 is in the neutral state where there is no phase difference between the support cam member 51 and the movable cam member 52, the movable cam member 52 is located at a position close to the rear of the vehicle, so that the movable cam member 52 does not generate a force for pressing the main clutch 30. That is, a disconnection state in which the main clutch 30 is reliably disengaged is achieved. Further, one end of the rearmost inner main clutch disc 31 is apart from the movable cam member 52 by the predetermined clearance C1.

Next, a state in which a difference in rotational speed occurs between the outer case 10 and the inner shaft 20 will be described. When a control signal is input into the electromagnetic clutch device 40 and a current is supplied to the electromagnetic coil 42, a loop magnetic circuit that starts from the electromagnetic coil 42 and passes through the yoke 41, the rear housing 12, and the armature 43 is formed. When such a magnetic circuit is formed, the armature 43 is attracted toward the yoke-41 side, that is, the vehicle rear side.

As a result, the armature 43 presses the pilot clutch 44, so that the inner pilot clutch disc 44a frictionally engages with the outer pilot clutch discs 44b. Then, the torque of the outer case 10 is transmitted to the support cam member 51 via the pilot clutch 44, and the support cam member 51 rotates.

Because the movable cam member 52 is spline-fitted to the inner shaft 20, the movable cam member 52 rotates together with the inner shaft 20. Therefore, a phase difference occurs between the support cam member 51 and the movable cam member 52. Thai is, under the action of the cam followers 53 and the cam grooves, the movable cam member 52 is moved in such a direction that the movable cam member 52 moves away from the support cam member 51 in the axial direction (moves toward the front of the vehicle). Thus, the movable cam member 52 presses the main clutch 30 toward the front of the vehicle.

As a result, the inner main clutch discs 31 and the outer main clutch discs 32 come into contact with each other, so that they are placed in a frictional engagement state. Accordingly, the torque of the outer case 10 is transmitted to the inner shaft 20 on the basis of a frictional force of the main clutch 30. The transmission torque reduces the difference in rotational speed between the outer case 10 and the inner shaft 20.

By controlling the control signal to be input into the electromagnetic clutch device 40 as appropriate, the value of a current to be supplied to the electromagnetic coil 42 is changed and a frictional engagement force of the main clutch 30 is controlled. That is, the driving force transmission apparatus 1 is configured such that it is possible to control switching of the driving force transmission apparatus 1 between the connection state and the disconnection state and distribution of a driving force in the connection state, on the basis of the control signal input into the electromagnetic clutch device 40.

Figure 2:
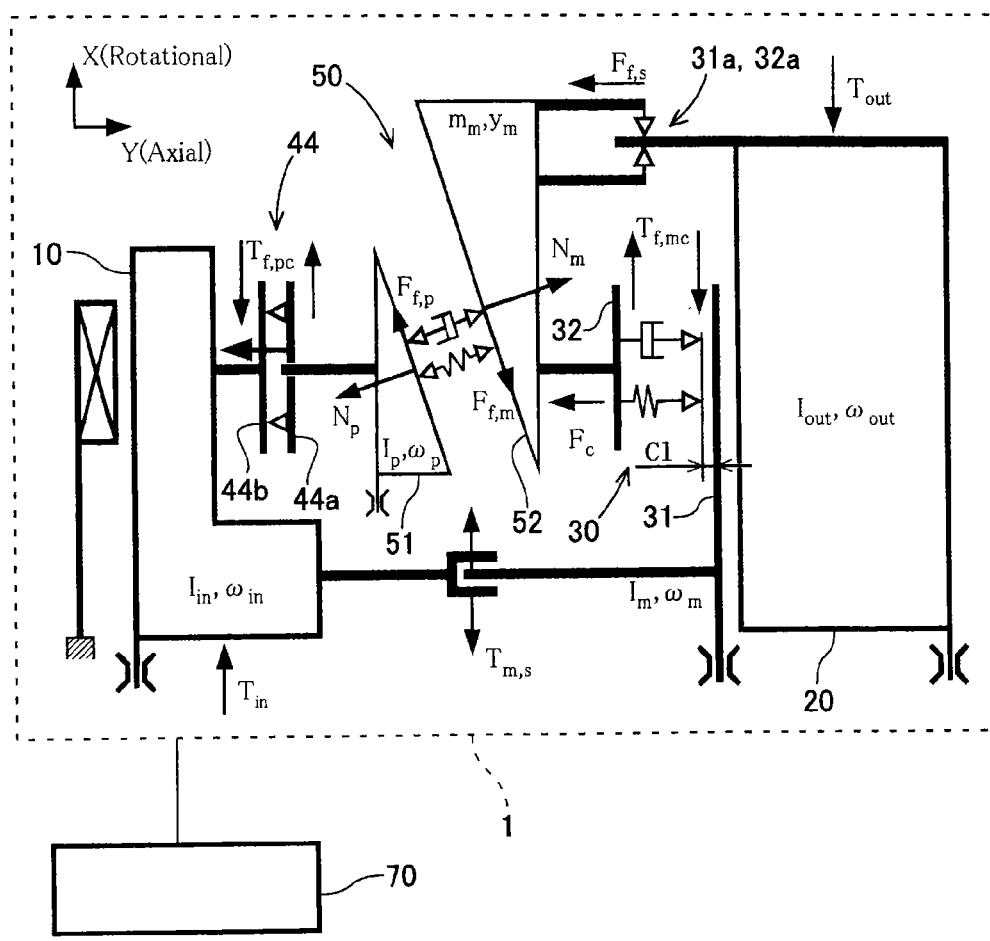
FIG. 2 is a view schematically illustrating a model of the driving force transmission apparatus and a transmission torque estimation unit.

Next, description will be provided on modeling of each of members that constitute the driving force transmission apparatus 1, which is executed by the transmission torque estimation unit 70. The driving force transmission apparatus 1 is illustrated as a conceptual model as illustrated in FIG. 2. The transmission torque estimation unit 70 estimates a torque transmittable between the outer case 10 and the inner shaft 20 with respect to a control signal, on the basis of a first model to a fifth model corresponding to Equations (1) to (5) indicated below.

The first model is a model in which an equation of motion of the outer case 10 in a rotation direction is modeled, and is expressed by Equation (1). A left-hand side of Equation (1) is an angular momentum of the outer case 10, which is expressed by a product of an inertia moment $I_{in}$ of the outer case 10 to which a torque is input, and a derivative value of an angular velocity $\omega_{in}$ thereof. As indicated in a right-hand side of Equation (1), the angular momentum is equal to the sum of an input torque $T_{in}$ input into the outer case 10, a spline torque $T_{m,s}$ of the main clutch 30, a friction torque $T_{f,pc}$ of the pilot clutch 44, and a drag friction torque $T_d$ of oil.

$$I_{in}\dot{\omega}_{in} = \vec{T}_{in} + \vec{T}_{m,s} + \vec{T}_{f,pc} + \vec{T}_d \qquad \text{Equation (1)}$$

$I_{in}$: Inertia Moment of Outer Case $\omega_{in}$: Angular Acceleration of Outer Case $\vec{T}_{in}$: Input Torque input into Outer Case $\vec{T}_{m,s}$: Spline Torque of Main Clutch $\vec{T}_{f,pc}$: Friction Torque of Pilot Clutch $\vec{T}_d$: Drag Friction Torque of Oil More specifically, the input torque $T_{in}$ input into the outer case 10 is a rotary driving force from the engine, which is input into the outer case 10 via the propeller shaft. The spline torque $T_{m,s}$ of the main clutch 30 is a torque transmitted between the spline portions 31a, 32a in the main clutch 30 and mating members to which the spline portions 31a, 32a are spline-fitted. Accordingly, the spline torque $T_{m,s}$ of the main clutch 30 is contained in the first model for representing the outer case 10 and the third model for representing the outer main clutch discs 32.

The modeling is executed such that the spline torque $T_{m,s}$ contains backlashes between the spline portions 31a, 32a and their mating members in the rotation direction. That is, in actuality, a backlash is provided between each of the spline portions 31a, 32a and its mating member. However, the modeling is executed on the assumption that the outer main clutch discs 32 move relative to the inner main clutch discs 31 in the rotation direction, and the backlashes occur only between the outer case 10 and the outer main clutch discs 32.

The friction torque $T_{f,pc}$ of the pilot clutch 44 is a friction model of the pilot clutch 44, in which a torque transmittable between the inner pilot clutch disc 44a and the outer pilot clutch discs 44b is modeled. That is, the friction torque $T_{f,pc}$ indicates a torque that the pilot clutch 44 is able to transmit to the support cam member 51 of the cam mechanism 50, with respect to a coefficient of friction that varies depending on a control signal input into the electromagnetic clutch device 40 and a relative angular velocity difference between the inner pilot clutch disc 44a and the outer pilot clutch discs 44b. Therefore, the friction torque $T_{f,pc}$ of the pilot clutch 44 is contained in the first model for representing the outer case 10 and the second model for representing the support cam member 51 and the inner pilot clutch disc 44a.

The drag friction torque $T_d$ of oil is a torque which is generated due to the viscosity or the like of the lubricant supplied in the space defined by the outer case 10 and the inner shaft 20 in a fluid-tight manner and which is transmitted from the outer case 10 side to the inner shaft 20 via the lubricant on the basis of the difference in rotational speed between the outer case 10 and the inner shaft 20. In view of this, the drag friction torque $T_d$ of oil is contained in the first model for representing the outer case 10 and the fourth model for representing the inner shaft 20.

The second model is a model in which an equation of motion, in the rotation direction, of the inner pilot clutch disc 44a and the support cam member 51 as one unit is modeled, and is expressed by Equation (2). A left-hand side of Equation (2) is an angular momentum of the support cam member 51 and the inner pilot clutch disc 44a, which is expressed by a product of an inertia moment $I_p$ of the support cam member 51 and the inner pilot clutch disc 44a, and a derivative value of an angular velocity $\omega_p$ thereof. As indicated in a right-hand side of Equation (2), the angular momentum is equal to the sum of the friction torque $T_{f,pc}$ of the pilot clutch 44, a cam torque $T_{Np}$ of the support cam member 51, and a load-dependent friction torque $T_{Ff,p}$ of the support cam member 51.

$$I_p \dot{\omega}_p = \vec{T}_{f,pc} + \vec{T}_{Np} + \vec{T}_{Ff,p} \qquad \text{Equation (2)}$$

$I_p$: Inertia Moment of Inner Pilot Clutch. Disc
$\omega_p$: Angular Acceleration of Inner Pilot Clutch Disc
$\vec{T}_{f,pc}$: Friction Torque of Pilot Clutch
$\vec{T}_{Np}$: Cam Torque of Support Cam Member
$\vec{T}_{Ff,p}$: Dependent Friction Torque of Support Cam Member More specifically, the friction torque $T_{f,pc}$ of the pilot clutch 44 is the friction model of the pilot clutch 44 contained also in the first model, as described above. The cam torque $T_{Np}$ of the support cam member 51 is modeled based on the operating characteristic of the cam mechanism 50 which is defined by an effective radius of the cam mechanism 50 and an internal force Np of the support cam member 51. Here, the effective radius of the cam mechanism 50 corresponds to a radial distance from the rotation axis of the cam mechanism 50 to a position of contact between each cam follower 53 to a corresponding one of the cam grooves. That is, the cam torque $T_{Np}$ of the support cam member 51 corresponds to a torque that the support cam member 51 applies to the cam followers 53 from the cam grooves.

The load-dependent friction torque $T_{Ff,p}$ of the support cam member 51 is a torque generated by contact between the support cam member 51 and the cam followers 53. That is, the load-dependent friction torque $T_{Ff,p}$ corresponds to a rotation-direction component of friction caused by sliding of the cam followers 53 with respect to the cam grooves of the support cam member 51, and is modeled based on the characteristic of the cam mechanism 50, which is defined by the effective radius of the cam mechanism 50, a gradient (cam tilt angle) of the cam grooves of the support cam member 51, and the like.

The third model is a model in which an equation of motion of the outer main clutch discs 32 in a rotation direction is modeled, and is expressed by Equation (3). A left-hand side of Equation (3) is an angular momentum expressed by a product of an inertia moment $I_m$ of the outer main clutch discs 32 and a derivative value of an angular velocity $\omega_m$ thereof. As indicated in a right-hand side of Equation (3), the angular momentum is equal to the sum of the spline torque $T_{m,s}$ of the main clutch 30 and a friction torque $T_{f,mc}$ of the main clutch 30.

$$I_m \dot{\omega}_m = \vec{T}_{m,s} + \vec{T}_{f,mc} \qquad \text{Equation (3)}$$

$I_m$: Inertia Moment of Outer Main Clutch Discs
$\omega_m$: Angular Acceleration of Outer Main Clutch Discs
$\vec{T}_{m,s}$: Spline Torque of Main Clutch
$\vec{T}_{f,mc}$: Friction Torque of Main Clutch More specifically, as described above, the spline torque $T_{m,s}$ of the main clutch 30 is contained also in the first model, and is the torque transmitted between the spline portions 31a, 32a and their mating members. The friction torque $T_{f,mc}$ of the main clutch 30 is a friction model of the main clutch 30, in which a torque transmittable between the inner main clutch discs 31 and the outer main clutch discs 32 is modeled. That is, the friction torque $T_{f,mc}$ indicates a torque transmittable to the inner shaft 20 from the outer main clutch discs 32 in the main clutch 30, to which a pressing force is applied by the movable cam member 52 of the cam mechanism 50.

In view of this, the friction torque $T_{f,mc}$ of the main clutch 30 is contained in the third model for representing the outer main clutch discs 32 and the fourth model for representing the inner shaft 20. Further, in the present embodiment, the friction model of the main clutch 30 contains a rigidity model that indicates an axial deformation amount of the main clutch 30 with respect to the pressing force applied to the main clutch 30.

The fourth model is a model in which an equation of motion of the inner shaft 20 in a rotation direction is modeled, and is expressed by Equation (4). A left-hand side of Equation (4) is an angular momentum expressed by a product of an inertia moment $I_{out}$ of output members (the inner shaft 20, the inner main clutch discs 31, the movable cam member 52) that output a torque and a derivative value of an angular velocity $\omega_{out}$ thereof. As indicated in a right-hand side of Equation (4), the angular momentum is equal to the sum of an output torque $T_{out}$ of the inner shaft 20, the friction torque $T_{f,mc}$ of the main clutch 30, a cam torque $T_{Nm}$ of the movable cam member 52, a load-dependent friction torque $T_{Ff,m}$ of the movable cam member 52, and the drag friction torque $T_d$ of oil.

$$I_{out} \dot{\omega}_{out} = \vec{T}_{out} + \vec{T}_{f,mc} + \vec{T}_{Nm} + \vec{T}_{Ff,m} + \vec{T}_d \qquad \text{Equation (4)}$$

$I_{out}$: Sum of Inertia Moment of Inner Shaft, Inertia Moment of Inner Main Clutch Discs, Inertia Moment of Movable Cam Member $\dot{\omega}_{out}$: Angular Acceleration of Inner Shaft $\vec{T}_{out}$: Output Torque of Inner Shaft $\vec{T}_{f,mc}$: Friction Torque of Main Clutch $\vec{T}_{Nm}$: Cam Torque of Movable Cam Member $\vec{T}_{Ff,m}$: Load-Dependent Friction Torque of Movable Cam Member $\vec{T}_d$: Drag Friction Torque of Oil More specifically, the output torque $T_{out}$ of the inner shaft 20 is a torque output from the driving force transmission apparatus 1 to the rear differential for the auxiliary drive wheels. The friction torque $T_{f,mc}$ of the main clutch 30 is the friction model of the main clutch 30, which is contained also in the third model, as described above. The cam torque $T_{Nm}$ of the movable cam member 52 is modeled based on the operating characteristic of the cam mechanism 50, which is defined by the effective radius of the cam mechanism 50 and an internal force $N_p$ of the movable cam member 52. That is, the cam torque $T_{Nm}$ of the movable cam member 52 corresponds to a torque applied to the cam grooves of the movable cam member 52 from the cam followers 53.

The load-dependent friction torque $T_{Ff,m}$ of the movable cam member 52 is a torque that is generated by contact between the movable cam member 52 and the cam followers 53. That is, the load-dependent friction torque $T_{Ff,m}$ corresponds to a rotation-direction component of friction caused by sliding of the cam followers 53 with respect to the cam grooves of the movable cam member 52, and is modeled based on the characteristic of the cam mechanism 50 which is defined by the effective radius of the cam mechanism 50, a gradient (cam tilt angle) of the cam grooves of the movable cam member 52, and the like. The drag friction torque $T_d$ of oil is the torque transmitted via the lubricant and contained also in the first model, as described above.

The fifth model is a model in which an equation of motion, in an axial direction, of the inner main clutch discs 31 and the movable cam member 52 as one unit is modeled, and is expressed by Equation (5). A left-hand side of Equation (5) is a momentum expressed by a product of a mass $m_m$ of the inner main clutch discs 31 and the movable cam member 52, and a second order derivative value of an axial position $y_m$ thereof. As indicated in a right-hand side of Equation (5), the momentum is equal to the sum of an internal force $N_m$ of the movable cam member 52, an internal frictional force $F_{f,m}$ of the movable cam member 52, a reaction force $F_c$ of the inner main clutch discs 31, and a load-dependent frictional force $F_{f,s}$ of the spline portions 31a, 32a.

$$m_m \ddot{y}_m = \vec{N}_m + \vec{F}_{f,m} + \vec{F}_c + \vec{F}_{f,s} \qquad \text{Equation (5)}$$

$m_m$: Mass of Inner Main Clutch Discs and Movable cam member $\ddot{y}_m$: Acceleration Speed of Inner Main Clutch Discs and Movable Cam Member $\vec{N}_m$: Internal Force of Movable Cam Member $\vec{R}_{f,m}$: Internal Frictional Force of Movable Cam Member $\vec{F}_c$: Reaction Force of Inner Main Clutch Discs $\vec{F}_{f,s}$: Load-Dependent Frictional Force of Spline Portions More specifically, the internal force $N_m$ of the movable cam member 52 is expressed by a model containing a cam operation model that indicates a displacement of the movable cam member 52 with respect to a phase difference between the support cam member 51 and the movable cam member 52, and an axial viscoelastic model of the cam mechanism 50. The cam operation model is obtained by modeling the operating characteristic of the cam mechanism 50, which is determined by elements such as a radius and a gradient of the cam grooves in the cam mechanism 50.

Further, the viscoelastic model of the cam mechanism 50 is a viscoelastic characteristic corresponding to a damper and a spring in the equation of motion. More specifically, the viscoelastic model is expressed by the sum of a product ($c_p v$) of a viscous resistance coefficient $c_p$ and a moving velocity v (derivative value of $y_m$) of the movable cam member 52 and a product ($k_p x$) of a constant $k_p$ of spring and a displacement x ($y_m - y_0$: $y_0$ is an initial position), at the time when the movable cam member 52 of the cam mechanism 50 moves in the axial direction.

The internal frictional force $F_{f,m}$ of the movable cam member 52 is an axial force that is generated by contact between the movable cam member 52 and the cam followers 53. That is, the internal frictional force $F_{f,m}$ corresponds to an axial component of the friction caused by sliding of the cam followers 53 with respect to the cam grooves of the movable cam member 52, and is modeled based on the characteristic of the cam mechanism 50, which is defined by the effective radius of the cam mechanism 50, the gradient (cam tilt angle) of the cam grooves of the movable cam member 52, and the like.

The reaction force $F_c$ of the inner main clutch discs 31 is expressed by a model containing a viscoelastic model of the main clutch 30. The viscoelastic model of the main clutch 30 is expressed by the sum of a product ($c_i v$) of a viscous resistance coefficient $c_i$ and a moving velocity v (derivative value of $y_m$) of the inner main clutch discs 31 and a product ($k_i x$) of a constant $k_i$ of spring and the displacement magnitude x ($y_m - y_0$: $y_0$ is an initial position), at the time when the inner main clutch discs 31 of the main clutch 30 move in the axial direction. Further, on the assumption that the inner main clutch discs 31 and the movable cam member 52 move together with each other in the axial direction, in the viscoelastic models, the viscous resistance coefficients may be equal to each other and the constants of spring may be equal to each other ($c_p = c_i$, $k_p = k_i$).

The load-dependent frictional force $F_{f,s}$ of the spline portions 31a, 32a contains axial friction models of axial friction between the spline portions 31a, 32a of the main clutch 30 and their mating members (the internal splines 11a of the outer case 10 and the external splines 20a of the inner shaft 20). Further, in the present embodiment, the load-dependent frictional force $F_{f,s}$ contains a model of axial friction between the internal splines formed on the movable cam member 52 and the external splines 20a of the inner shaft 20.

Next, the friction models of the main clutch 30 and the pilot clutch 44 will be described in detail. As described above, the friction torque $T_{f,mc}$, which is the friction model of the main clutch 30, is contained in the third model and the fourth model, and the friction torque $T_{f,pc}$, which is the friction model of the pilot clutch 44, is contained in the first model and the second model. The friction torque $T_{f,pc}$ of the pilot clutch 44 and the friction torque $T_{f,mc}$ of the main clutch 30 are expressed by Equations (6), (7) indicated below, respectively.

$$\vec{T}_{f,pc} = \mu_p r_p n_p F_{n,p} \qquad \text{Equation (6)}$$

$$\vec{T}_{f,mc} = \mu_m r_m n_m F_{n,m} \qquad \text{Equation (7)}$$

$\vec{T}_{f,pc}$: Friction Torque of Pilot Clutch $\vec{T}_{f,mc}$: Friction Torque of Main Clutch $\mu_p$, $\mu_m$: Coefficient of Friction $r_p$, $r_m$: Average Radius $n_p$, $n_m$: Number of Clutch Discs
$F_{n,p}$, $F_{n,m}$: Pressing Force That is, the friction torques $T_{f,pc}$, $T_{f,mc}$ correspond to the products of coefficients $\mu_p$, $\mu_m$ of friction, average radii $R_p$, $R_m$, the numbers $n_p$, $n_m$ of clutch discs, and pressing forces $F_{n,p}$, $F_{n,m}$, respectively. More specifically, each of the coefficient $\mu_p$ of friction of the pilot clutch 44 and the coefficient $\mu_m$ of friction of the main clutch 30 is a coefficient of friction between its inner clutch disc(s) and its outer clutch discs. Each of the coefficients $\mu_p$, $\mu_m$ of friction may be defined, for example, by an LuGre model which indicates the relationship between a moving velocity (relative angular velocity difference) and a coefficient of friction, and which is able to express a state of transition from static friction to kinetic friction or a state of transition from kinetic friction to static friction. Each of the average radii $R_p$, $R_m$ is a radius of a friction surface of clutch discs frictionally engaging with each other. Each of the numbers $n_p$, $n_m$ of clutch discs indicates the total number of the inner clutch disc(s) and the outer clutch discs.

The pressing force $F_{n,p}$ in the friction torque $T_{f,pc}$ of the pilot clutch 44 is a model that varies depending on a control signal input into the electromagnetic clutch device 40. That is, the pressing force $F_{n,p}$ applied to the pilot clutch 44 is modeled so as to depend on the control signal, independently of an axial position of the outer pilot clutch discs 44b with respect to the inner pilot clutch disc 44a, namely, on the assumption that the axial position of each of the clutch discs 44a, 44b is fixed.

On the other hand, the pressing force $F_{n,m}$ in the friction torque $T_{f,mc}$ of the main clutch 30 is modeled by taking into account an axial displacement of the outer main clutch discs 32 with respect to the inner main clutch discs 31, because the main clutch 30 is influenced by the cam operating characteristic. More specifically, the pressing force $F_{n,m}$ applied to the main clutch 30 is expressed by a model containing an axial non-linear viscoelastic model according to the displacement.

The viscoelastic model is a non-linear viscoelastic model of the main clutch 30, contained in the fifth model, and as described above, the viscoelastic model is expressed with the use of the viscous resistance coefficient $c_i$ of the inner main clutch discs 31 and the constant $k_i$ of spring that varies depending on an axial pressing amount (displacement) of the inner main clutch discs 31. Further, in this viscoelastic model, the axial position $y_m$ of the inner main clutch discs 31 and the movable cam member 52 is input as a variable, but the initial position $y_o$ of the axial position $y_m$ contains the clearance C1. That is, an axial position at which the movable cam member 52 comes into contact with the rearmost inner main clutch disc 31 after moving in the axial direction until the clearance C1 is eliminated is set as the initial position $y_0$. Thus, the friction torque $T_{f,mc}$, which is the friction model of the main clutch 30, is modeled so as to contain the clearance C1.

The transmission torque estimation unit 70 executes the aforementioned modeling of the driving force transmission apparatus 1, so as to estimate a transmittable torque. Next, variations of a transmission torque estimated according to each modeling will be described with reference to FIG. 3 to FIG. 8. Note that, FIG. 3 to FIG. 7 are drawn on the assumption that a predetermined control signal (current) is input into the electromagnetic clutch device 40, and indicate estimates of a transmission torque with respect to an angular difference between the outer case 10 and the inner shaft 20 when the inner shaft 20 is rotated relative to the outer case 10 in the above-described state.

Figure 3:
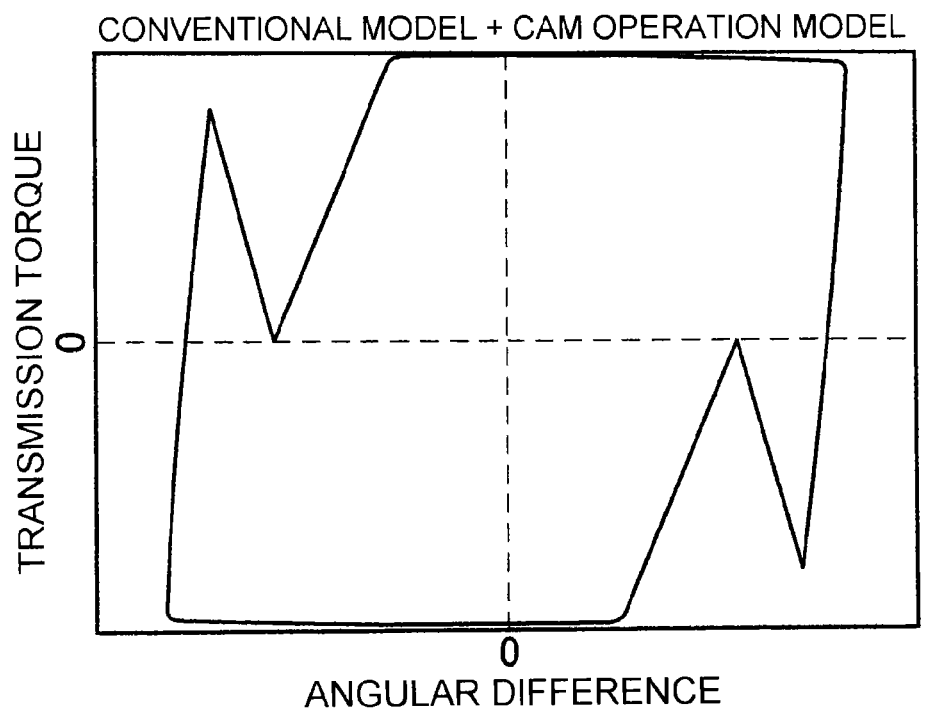
FIG. 3 is a graph illustrating the relationship between rotational angles of an outer case and an inner case, and a transmission torque estimated on the basis of a model obtained by adding a cam operation model of a cam mechanism to a conventional mode.

At first, when the cam operation model of the cam mechanism 50 is added to a conventional model, a graph as illustrated in FIG. 3 is obtained. Note that, the conventional model is a model used to estimate a transmission torque based on a velocity of the inner shaft 20 relative to the outer case 10 and a pressing force. More specifically, with the conventional model, first, the sliding velocity between the inner main clutch discs 31 and the outer main clutch discs 32 is used as the velocity of the inner shaft 20 relative to the outer case 10, and a coefficient of friction corresponding to the sliding velocity is calculated. Further, on the assumption that a constant pressing force with respect to a current value is applied to each clutch disc, a transmission torque is estimated based on the coefficient of friction and the pressing force.

When the cam operation model of the cam mechanism 50 contained in the fifth model is added to such a conventional model, a change of the transmission torque caused when the direction of rotation of the movable cam member 52 with respect to the support cam member 51 is reversed is added. That is, when the rotation direction is reversed, the transmission torque varies along with a decrease and an increase of the pressing force because the cam mechanism 50 is temporarily placed in the neutral state.

Figure 4:
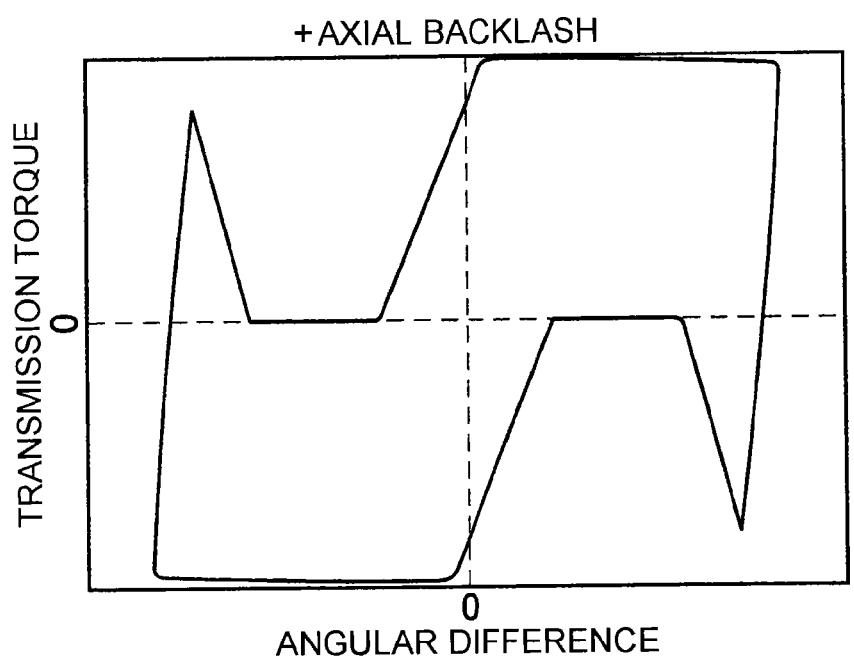
FIG. 4 is a graph obtained by adding a clearance between the main clutch and the cam mechanism to FIG. 3.

When mechanical axial backlash (contained in the fifth model) such as the clearance C1 provided between the inner main clutch disc 31 of the main clutch 30 and the movable cam member 52 is added, a graph as illustrated in FIG. 4 is obtained. Until the movable cam member 52 of the cam mechanism 50, which has been in the neutral state, moves to eliminate the clearance C1, no pressing force is applied to the inner main clutch disc 31. Therefore, a period in which the transmission torque is zero corresponds to a time period until the movable cam member 52 comes into contact with the inner main clutch disc 31.

Figure 5:
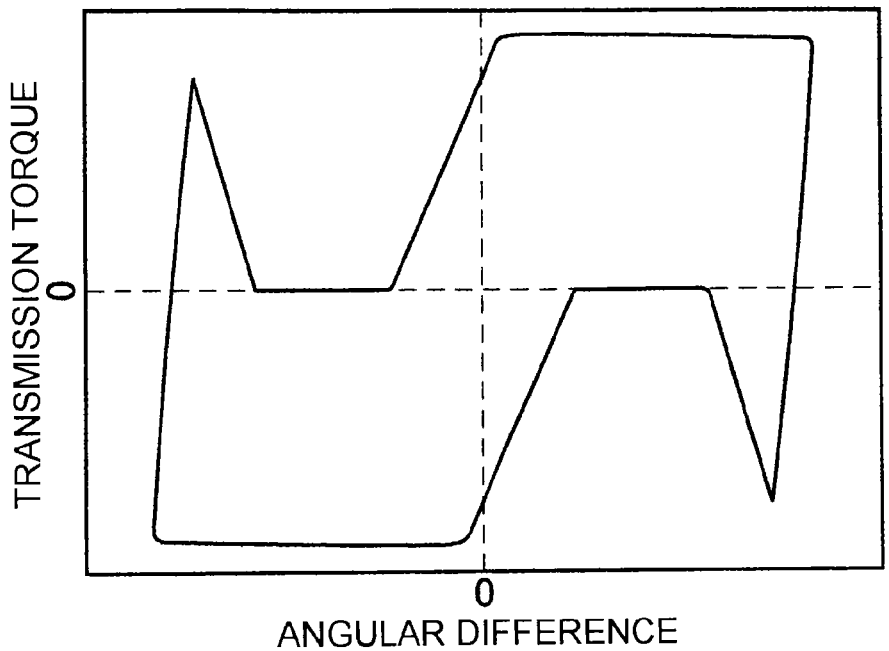
FIG. 5 is a graph obtained by adding friction models of spline portions to FIG. 4.

Subsequently, when the axial friction model of the spline portions 31a, 32a contained in the fifth model is added, a graph as illustrated in FIG. 5 is obtained. When an axial frictional force occurs at the spline portions 31a, 32a of the main clutch 30, the pressing force by the cam mechanism 50 is decreased accordingly. This decreases the absolute values of a maximum value and a minimum value of the transmission torque.

Figure 6:
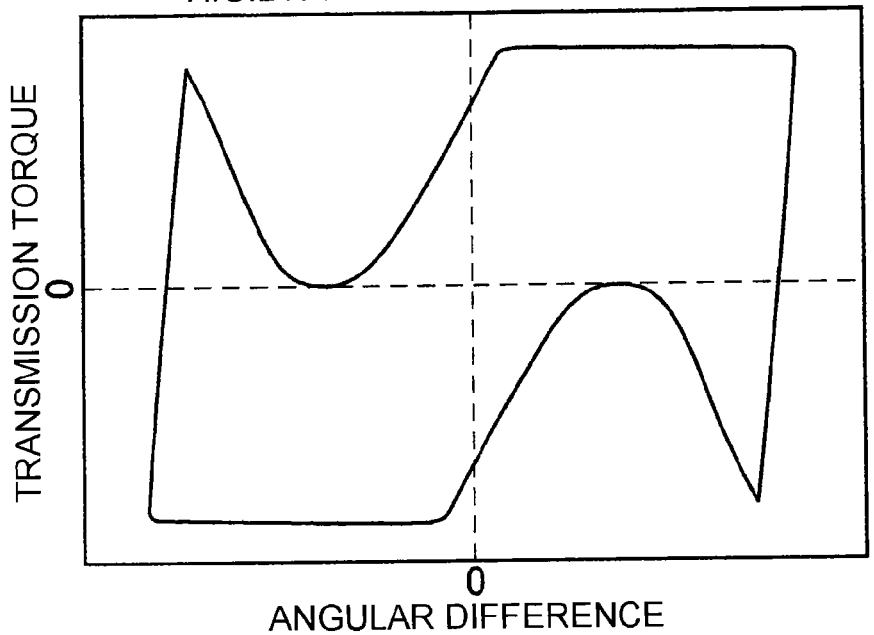
FIG. 6 is a graph obtained by adding a rigidity model of the main clutch to FIG. 5.

Further, when the variable rigidity model of the main clutch 30 contained in the third model and the fourth model is added, a graph as illustrated in FIG. 6 is obtained. On the assumption that the main clutch 30 is a rigid body as in a conventional case, the transmission torque immediately responds to a change of the axial position of the clutch discs 31, 32. In contrast, when the rigidity of the main clutch 30 is taken into account, the transmission torque changes in a curve, like an actually measured value.

Figure 7:
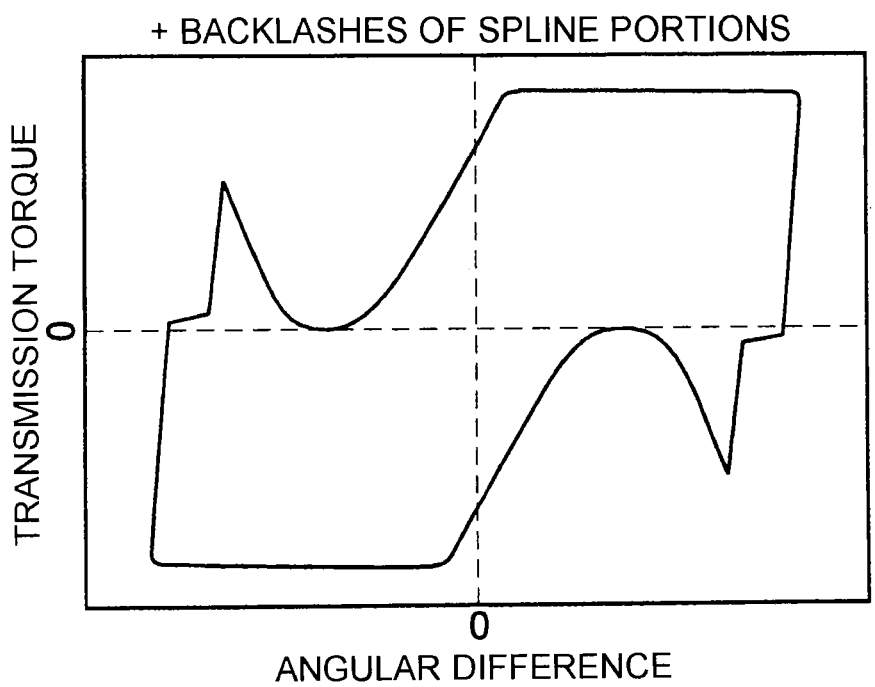
FIG. 7 is a graph obtained by adding backlashes of the spline portions to FIG. 6.

Further, when the axial backlash of the spline portions 31a, 32a which is contained in the first model and the third model is added, a graph as illustrated in FIG. 7 is obtained. In a case where the direction of rotation of the inner shaft 20 with respect to the outer case 10 is reversed, even if the inner main clutch discs 31 and the outer main clutch discs 32 are engaged with each other, the torque is not transmitted in a period until the backlash is eliminated. Therefore, a period in which the transmission torque is approximately zero corresponds to a time period until the axial backlash of the spline portions 31a, 32a is eliminated.

Figure 8:
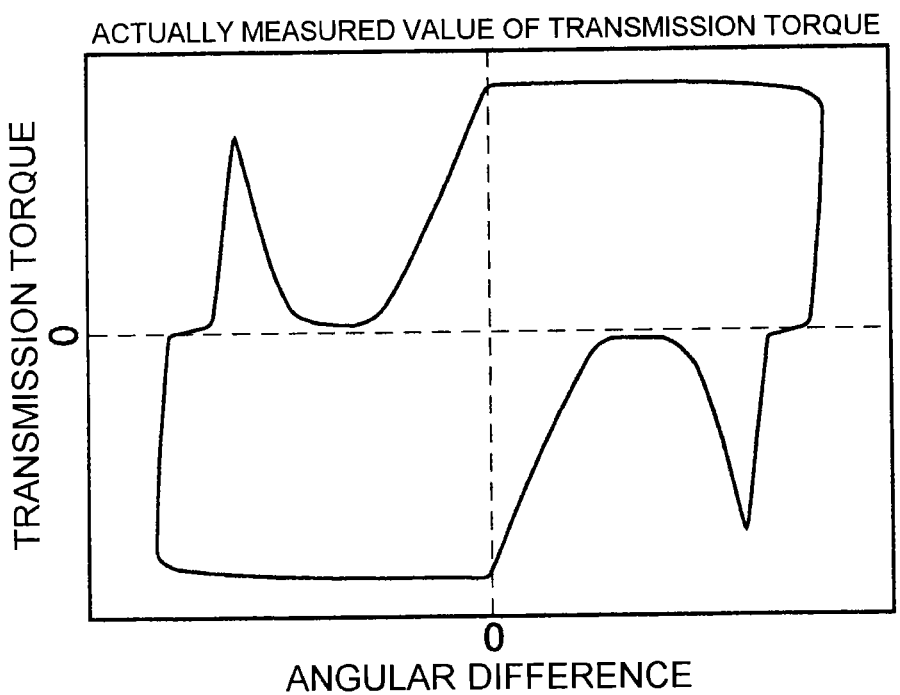
FIG. 8 is a graph illustrating the relationship between the rotational angles of the outer case and the inner case and an actually measured transmission torque.

When the inner shaft 20 is rotated relative to the outer case 10 in a state where the predetermined control signal (current) is input into the electromagnetic clutch device 40, a transmission torque between both members 10, 20 is measured, as illustrated in FIG. 8. As is apparent from the drawings, it is found that an estimate (FIG. 7) of the transmission torque which is obtained by the modeling of the transmission torque estimation unit 70 according to the present embodiment is similar to an actually measured value (FIG. 8).

Next, estimation of a transmission torque with respect to a control signal (current) with the use of the modeling of the transmission torque estimation unit 70 will be described with reference to FIG. 9 to FIG. 11. Note that, FIG. 9 to FIG. 11 each indicate an estimate of a torque transmittable between the outer case 10 and the inner shaft 20 when the control signal to be input into the electromagnetic clutch device 40 is changed.

Figure 9:
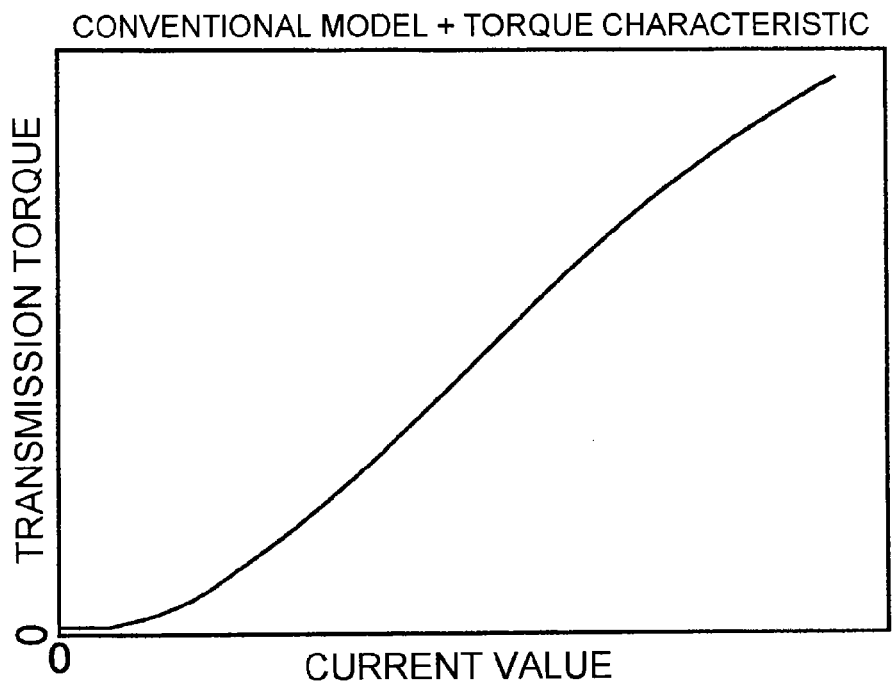
FIG. 9 is graph illustrating the relationship between a current value and a transmission torque, and obtained by adding a first model, a second model, a third model and a fourth model to the conventional model.

First, when the torque characteristics (the first model to the fourth model) of the driving force transmission apparatus 1 with respect to current are added to the conventional model, a graph as illustrated in FIG. 9 is obtained. Note that, the conventional model is such a model that a pressing force applied to the main clutch 30 changes linearly with respect to the current value, and a transmission torque also changes linearly along with an increase and a decrease of the pressing force.

Further, the torque characteristics correspond to the first model to the fourth model obtained by modeling the equations of motion, in the rotation directions, of respective members of the driving force transmission apparatus 1. When the torque characteristics are added to the conventional model, the transmission torque changes so as to follow the change of the current value. Accordingly, the transmission torque does not change linearly, but changes in a curve as illustrated in FIG. 9.

Figure 10:
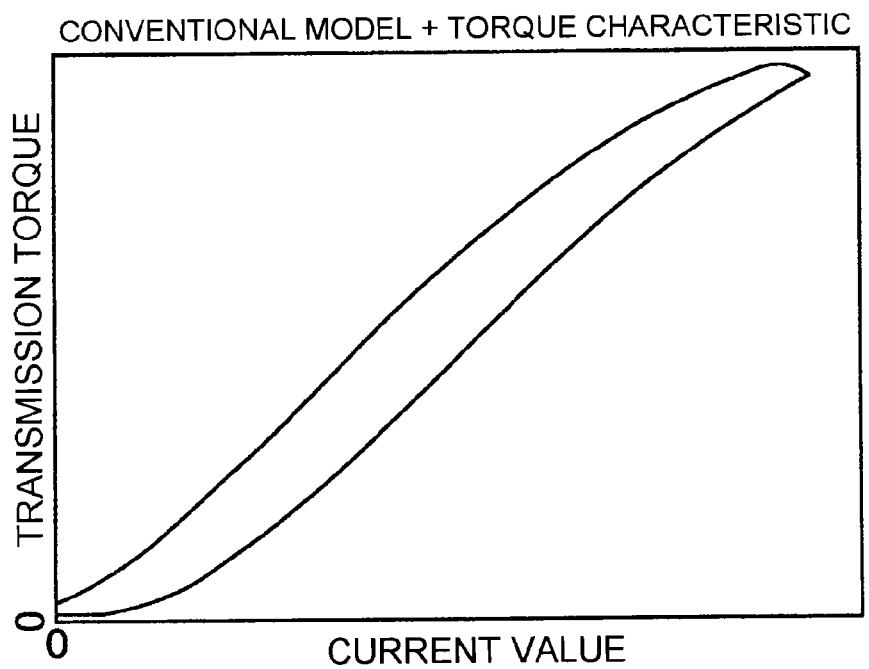
FIG. 10 is a graph obtained by an electromagnetic hysteresis characteristic (current hysteresis characteristic) of the driving force transmission apparatus to the graph in FIG. 9.

Then, when an electromagnetic hysteresis characteristic (current hysteresis characteristic) in the electromagnetic clutch device 40 is added, a graph as illustrated in FIG. 10 is obtained. The electromagnetic hysteresis characteristic is caused due to an influence of residual magnetism that remains in the electromagnetic clutch device 40 and its peripheral members when a magnetic circuit is formed by the electromagnetic clutch device 40. For example, when the current value is decreased, a decrease of the transmission torque is delayed under the influence of the residual magnetism, and the transmission torque is higher than that in a case where the current value is increased.

Figure 11:
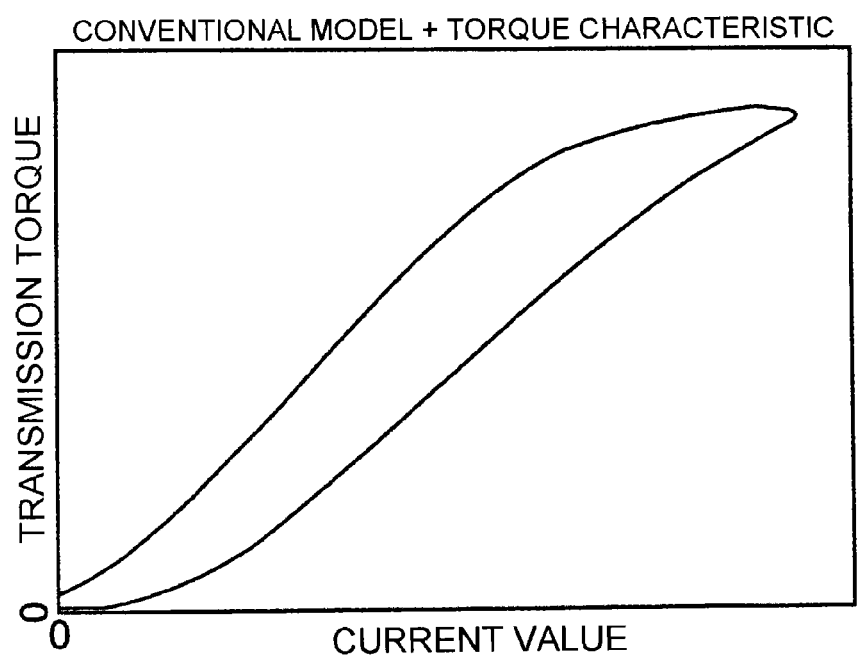
FIG. 11 is a graph obtained by adding a mechanical hysteresis characteristic (fifth model) of the driving force transmission apparatus to the graph in FIG. 10.

When a mechanical hysteresis characteristic (the fifth model) in the driving force transmission apparatus 1 is added subsequently, a graph as illustrated in FIG. 11 is obtained. The mechanical hysteresis is caused due to an influence of an axial operation, for example the operation of the inner main clutch disc 31 and the movable cam member 52, as indicated in the fifth model. Especially, the mechanical hysteresis is largely influenced by the load-dependent frictional force $F_{f,s}$ of the spline portions 31a, 32a. As is apparent from a comparison between FIG. 10 and FIG. 11, the mechanical hysteresis increases the difference in the transmission torque between a case where the current value is decreased and a case where the current value is increased.

With the transmission torque estimation unit 70, it is possible to efficiently express, with the use of the first model to the fifth first model, motions, in the rotation direction and the axial direction, of the respective members that constitute the driving force transmission apparatus 1. Especially, the second model is obtained by modeling the inner pilot clutch disc 44a and the support cam member 51 as one unit, and the fifth model is obtained by modeling the inner main clutch discs 31 and the movable cam member 52 is modeled as one unit. Thus, the transmission torque estimation unit 70 is able to estimate a transmission torque with high accuracy by taking into account an operation specific to the cam mechanism 50 in the driving force transmission apparatus 1. Accordingly, it is possible to control or design the driving force transmission apparatus 1 more appropriately by reflecting characteristics of the transmission torque thus estimated.

Further, the friction model (friction torque $T_{f,pc}$) of the pilot clutch 44, contained in the first model and the second model, is modeled so as to contain a product of the coefficient $\mu_p$ of friction according to a relative angular velocity difference between the clutch discs 44a, 44b and the pressing force $F_{n,p}$ applied to the pilot clutch 44. That is, the friction model (friction torque $T_{f,pc}$) of the pilot clutch 44 is such a model that a frictional force varies independently of axial movements of the clutch discs 44a, 44b, but depending on the control signal. Thus, it is possible to estimate a transmittable torque with higher accuracy by efficiently modeling a torque characteristic of the pilot clutch 44.

On the other hand, the friction model (friction torque $T_{f,mc}$) of the main clutch 30, contained in the third model and the fourth model is modeled so as to contain a product of the coefficient $\mu_m$ of friction according to a relative angular velocity difference between the clutch discs 31, 32 and the pressing force $F_{n,m}$ applied to the main clutch 30. That is, in consideration of axial movements of the clutch discs 31, 32, the friction model (friction torque $T_{f,mc}$) of the main clutch 30 contains an axial viscoelastic model according to a displacement thereof. This makes it possible to estimate a transmission torque with higher accuracy by efficiently modeling a torque characteristic of the main clutch 30.

Further, the fifth model obtained by modeling the equation of motion, in the axial direction, of the inner main clutch discs 31 and the movable cam member 52 is such a model that the load-dependent frictional force $F_{f,s}$ of the spline portions 31a, 32a contains models of axial friction with respect to the mating members. As described above, in consideration of the axial frictions at the spline portions 31a, 32a which exert influence on a transmission torque, modeling is executed intensively on an axial friction of the inner main clutch discs 31 and the movable cam member 52. This makes it possible to estimate a transmission torque with high accuracy by efficiently modeling the axial frictions of the spline portions 31a, 32a which act on the main clutch 30.

The first model and the third model in which the equations of motion of the outer case 10 and the outer main clutch discs 32 in the rotation directions are modeled is such models that the spline torque $T_{m,s}$ of the main clutch 30 contains backlashes in the spline portions 31a, 32a. Thus, in consideration of an influence of the backlashes on a transmission torque, modeling is executed on the assumption that the backlashes at the spline portions 31a, 32a occur only between the outer case 10 and the outer main clutch discs 32. This allows efficient modeling containing the backlashes, thereby making it possible to estimate a transmission torque more accurately.

The friction model (friction torque $T_{f,mc}$) of the main clutch 30, contained in the third model and the fourth model, and the fifth model are modeled so as to contain the clearance C1 provided between the rearmost main clutch disc 31 and the movable cam member 52. This allows modeling in consideration of a period in which a torque is not transmitted under the influence of the clearance C1, thereby making it possible to estimate a transmission torque more accurately.

The friction model (friction torque $T_{f,mc}$) of the main clutch 30, contained in the third model and the fourth model, contains the rigidity model that indicates the amount of axial deformation of the main clutch 30. This makes it possible to accurately estimate a transmission torque that changes in a curve with respect to the pressing force under the influence of the rigidity of the main clutch 30.

In the present embodiment, the friction model ($T_{f,mc}$) of the main clutch 30 and the friction model ($T_{f,pc}$) of the pilot clutch 44 respectively contain the coefficients $\mu_p$, $\mu_m$ of friction, and the coefficients $\mu_p$, $\mu_m$ of friction are defined by the LuGre model that indicates a relationship between a moving velocity and a coefficient of friction. Meanwhile, the coefficients $\mu_p$, $\mu_m$ of friction may be set, as a simpler model, with the use of two values, that is, a coefficient of dynamic friction and a coefficient of static friction that are determined in advance, according to a moving velocity.

In the present embodiment, the driving force transmission apparatus 1 is used as a device that switches a vehicle between the two-wheel drive mode and a four-wheel drive mode. However, if a driving force transmission apparatus includes two kinds of clutches and a cam mechanism provided therebetween, the modeling by the transmission torque estimation unit may be executed on the driving force transmission apparatus. Further, the modeling by the transmission torque estimation unit may be applied to a model of a driveline of a vehicle. This allows the modeling to be used for optimization of a design of a power train of a vehicle.

What is claimed is:

1. A transmission torque estimation unit for a driving force transmission apparatus, the driving force transmission apparatus including:
    a cylindrical outer rotary member;
    an inner rotary member arranged inside the outer rotary member so as to be coaxial with the outer rotary member and rotatable relative to the outer rotary member;
    a main clutch that transmits a torque between the outer rotary member and the inner rotary member;
    an electromagnetic clutch device including a pilot clutch that is able to transmit a torque of the outer rotary member by attracting an armature with a magnetic force corresponding to a control signal; and
    a cam mechanism that is arranged between the main clutch and the pilot clutch, and that moves a movable cam member with respect to a support cam member in an axial direction by converting, into an axial pressing force, a torque based on a difference in rotational speed between rotation of the inner rotary member and rotation of the outer rotary member, which is transmitted via the pilot clutch, to press the main clutch, wherein
    the main clutch includes inner main clutch discs that are restrained from rotating relative to the inner rotary member but allowed to move in the axial direction, and outer main clutch discs that are restrained from rotating relative to the outer rotary member but allowed to move in the axial direction, and
    the pilot clutch includes an inner pilot clutch disc that is restrained from rotating relative to the support cam member but allowed to move in the axial direction, and an outer pilot clutch discs that are restrained from rotating relative to the outer rotary member but allowed to move in the axial direction,
    the transmission torque estimation unit estimating a torque transmittable between the outer rotary member and the inner rotary member with respect to the control signal based on:
        a first model containing a friction model of the pilot clutch, and obtained by modeling an equation of motion of the outer rotary member in a rotation direction;
        a second model containing the friction model of the pilot clutch, and obtained by modeling an equation of motion, in the rotation direction, of the support cam member and the inner pilot clutch disc as one unit;
        a third model containing a friction model of the main clutch, and obtained by modeling an equation of motion of the outer main clutch discs in the rotation direction;
        a fourth model containing the friction model of the main clutch, and obtained by modeling an equation of motion of the inner rotary member in the rotation direction; and
        a fifth model containing a cam operation model indicating a displacement of the movable cam member with respect to a phase difference between the support cam member and the movable cam member, and axial viscoelastic models of the main clutch and the cam mechanism, the fifth model being obtained by modeling an equation of motion, in the axial direction, of the inner main clutch disc and the movable cam member as one unit.

2. The transmission torque estimation unit according to claim 1, wherein:
    the friction model of the pilot clutch contains a product of a coefficient of friction based on a relative angular velocity difference between the inner pilot clutch disc and the outer pilot clutch discs, and a pressing force applied to the pilot clutch due to a magnetic force corresponding to the control signal; and
    the friction model of the main clutch contains a product of a coefficient of friction based on a relative angular velocity difference between the inner main clutch discs and the outer main clutch discs, and an axial pressing force applied to the main clutch.

3. The transmission torque estimation unit according to claim 2, wherein the axial pressing force applied to the main clutch is expressed by a model containing the cam operation model and the axial viscoelastic model of the main clutch.

4. The transmission torque estimation unit according to claim 1, wherein:
    in the main clutch, the outer main clutch discs have a spline portion that is spline-fitted to the outer rotary member, and the inner main clutch discs have a spline portion that is spline-fitted to the inner rotary member; and
    the fifth model contains models of axial frictions between the spline portions in the main clutch and corresponding mating members.

5. The transmission torque estimation unit according to claim 2, wherein:
    in the main clutch, the outer main clutch discs have a spline portion that is spline-fitted to the outer rotary member, and the inner main clutch discs have a spline portion that is spline-fitted to the inner rotary member; and
    the fifth model contains models of axial frictions between the spline portions in the main clutch and corresponding mating members.

6. The transmission torque estimation unit according to claim 3, wherein:
    in the main clutch, the outer main clutch discs have a spline portion that is spline-fitted to the outer rotary member, and the inner main clutch discs have a spline portion that is spline-fitted to the inner rotary member; and
    the fifth model contains models of axial frictions between the spline portions in the main clutch and corresponding mating members.

7. The transmission torque estimation unit according to claim 1, wherein:
    in the main clutch, the outer main clutch discs have a spline portion that is spline-fitted to the outer rotary member, and the inner main clutch discs have a spline portion that is spline-fitted to the inner rotary member; and the first model and the third model are each modeled so as to contain backlashes, in the rotation direction, between the spline portions in the main clutch and the corresponding mating members.

8. The transmission torque estimation unit according to claim 2, wherein:
in the main clutch, the outer main clutch discs have a spline portion that is spline-fitted to the outer rotary member, and the inner main clutch discs have a spline portion that is spline-fitted to the inner rotary member; and
the first model and the third model are each modeled so as to contain backlashes, in the rotation direction, between the spline portions in the main clutch and the corresponding mating members.

9. The transmission torque estimation unit according to claim 3, wherein:
in the main clutch, the outer main clutch discs have a spline portion that is spline-fitted to the outer rotary member, and the inner main clutch discs have a spline portion that is spline-fitted to the inner rotary member; and
the first model and the third model are each modeled so as to contain backlashes, in the rotation direction, between the spline portions in the main clutch and the corresponding mating members.

10. The transmission torque estimation unit according to claim 1, wherein:
in a state where there is no phase difference between the support cam member and the movable cam member, a predetermined clearance is provided between the main clutch and the movable cam member; and
the friction model of the main clutch is modeled so as to contain the clearance.

11. The transmission torque estimation unit according to claim 2, wherein:
in a state where there is no phase difference between the support cam member and the movable cam member, a predetermined clearance is provided between the main clutch and the movable cam member; and
the friction model of the main clutch is modeled so as to contain the clearance.

12. The transmission torque estimation unit according to claim 3, wherein:
in a state where there is no phase difference between the support cam member and the movable cam member, a predetermined clearance is provided between the main clutch and the movable cam member; and
the friction model of the main clutch is modeled so as to contain the clearance.

13. The transmission torque estimation unit according to claim 1, wherein:
in a state where there is no phase difference between the support cam member and the movable cam member, a predetermined clearance is provided between the main clutch and the movable cam member; and
the fifth model is modeled so as to contain the clearance.

14. The transmission torque estimation unit according to claim 2, wherein:
in a state where there is no phase difference between the support cam member and the movable cam member, a predetermined clearance is provided between the main clutch and the movable cam member; and
the fifth model is modeled so as to contain the clearance.

15. The transmission torque estimation unit according to claim 3, wherein:
in a state where there is no phase difference between the support cam member and the movable cam member, a predetermined clearance is provided between the main clutch and the movable cam member; and
the fifth model is modeled so as to contain the clearance.

16. The transmission torque estimation unit according to claim 1, wherein the friction model of the main clutch contains a rigidity model that indicates an axial deformation amount of the main clutch.

17. The transmission torque estimation unit according to claim 2, wherein the friction model of the main clutch contains a rigidity model that indicates an axial deformation amount of the main clutch.

18. The transmission torque estimation unit according to claim 3, wherein the friction model of the main clutch contains a rigidity model that indicates an axial deformation amount of the main clutch.

* * * * *